United States Patent
Rodgers

[11] 3,810,665
[45] May 14, 1974

[54] PIPE COUPLING
[76] Inventor: Fletcher Rodgers, Alva, Okla. 73717
[22] Filed: May 14, 1973
[21] Appl. No.: 359,742

Related U.S. Application Data
[63] Continuation-in-part of Ser. No. 199,585, Nov. 17, 1971, abandoned.

[52] U.S. Cl.................. 285/97, 285/105, 285/369
[51] Int. Cl............................................ F16l 17/00
[58] Field of Search........ 285/94, 97, 105, 144, 369

[56] References Cited
UNITED STATES PATENTS

| | | | |
|---|---|---|---|
| 3,420,554 | 1/1969 | Straub................................ | 285/97 |
| 3,454,289 | 7/1969 | Fowler................................ | 285/144 |
| 2,635,901 | 4/1953 | Osborn............................... | 285/105 X |
| 2,508,914 | 5/1950 | Graham.............................. | 285/105 |

FOREIGN PATENTS OR APPLICATIONS

| | | | |
|---|---|---|---|
| 556,256 | 9/1943 | Great Britain....................... | 285/97 |
| 459,687 | 9/1968 | Switzerland......................... | 285/97 |

Primary Examiner—Dave W. Arola

[57] ABSTRACT

A coupling for tubular members wherein a sleeve member is provided for quickly receiving the ends of adjacent tubular members, such as pipe sections, therein. Wedge members are provided within the sleeve for securely retaining the pipe ends therein, and sealing means is provided for the joint between the adjacent pipe ends for not only precluding leakage of fluid from the pipe sections, but also precluding leakage of fluid into the pipeline in the event the pipe joint is disposee beneath liquid, such as water, or the like.

1 Claim, 4 Drawing Figures

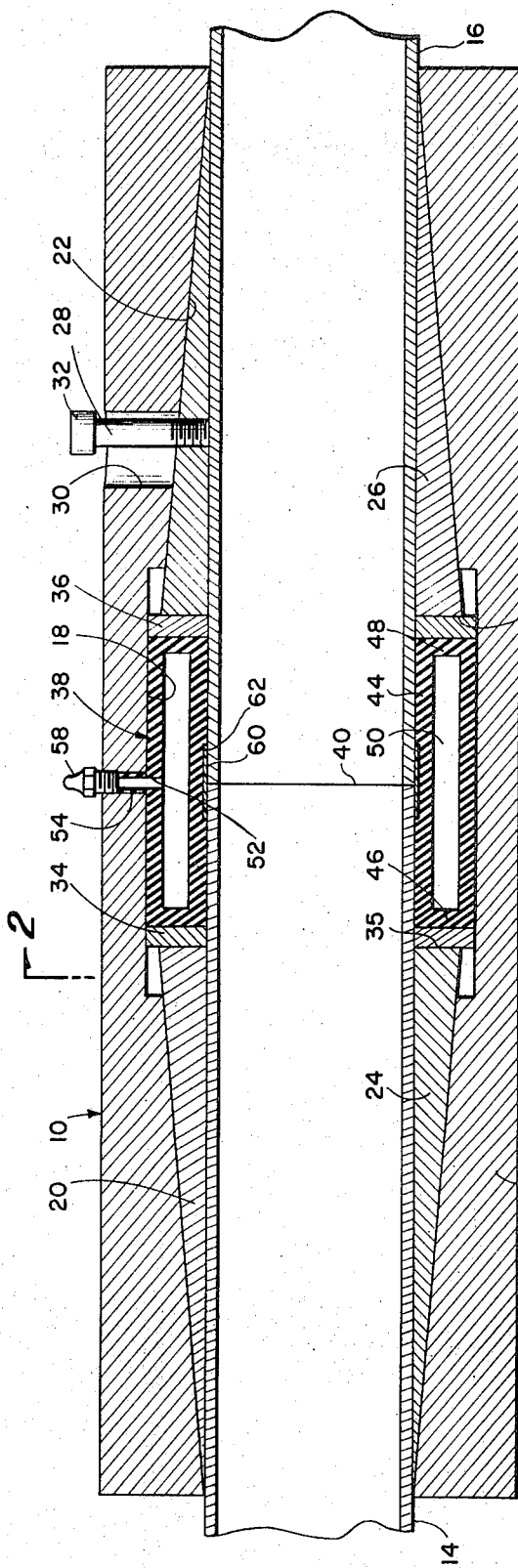
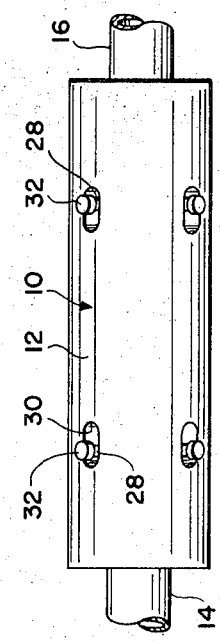
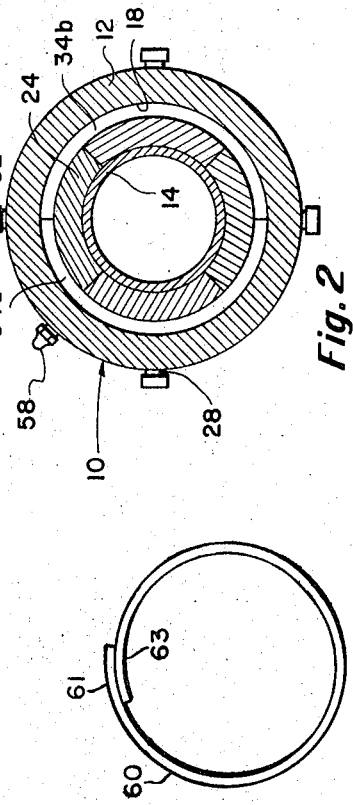

3,810,665

PIPE COUPLING

CROSS-REFERENCE TO RELATED APPLICATIONS

This application is a continuation-in-part of application Ser. No. 199,585, filed Nov. 17, 1971, and entitled "Pipe Coupling" (now abandoned).

BACKGROUND OF THE INVENTION

1. Field of the Invention

This invention relates to improvements in pipe couplings and more particularly, but not by way of limitation, to a coupling for connecting the adjacent ends of tubular members and efficiently sealing the joint therebetween.

2. Description of the Prior Art

Tubular members or pipe sections, and the like, are usually connected in tandem relation by coupling members which are utilized for securing the ends of adjacent pipe sections in substantial longitudinal alignment. It is normally desirable to provide a seal between the adjacent pipe sections in order to preclude leakage of fluid at the pipt joint, and in the event the pipe joint is disposed in a liquid, such as under water, it is extremly important that the seal at the joint be sufficient not only for precluding leakage of fluid from the pipeline, but also for precluding seepage of liquid into the pipeline.

SUMMARY OF THE INVENTION

The present invention contemplates a novel coupling for pipe sections and the like wherein an outer sleeve is provided for slidably receiving the ends of adjacent pipe sections therein. Oppositely disposed wedge members are provided within the sleeve for cooperating therewith to securely wedge the ends therein. A flexible sealing sleeve is interposed between the oppositely disposed edge members for sealing the joint between the pipe and radially inward pressure is exerted around the outer periphery of the flexible seal for compressing the sleeve against the pipe joint and for simultaneously increasing the over-all length of the sealing sleeve to provide wedging pressure against the oppositely disposed wedge members. In addition, it is preferable to provide a liner member directly over the joint for precluding squeezing of the flexible material into the joint between the pipe sections for reducing accidental damage to the sealing member. However, the liner member 60 is of an overall length less than the length of the sealing member whereby the sealing member engages the outer periphery of the pipe sections on the opposite sides of the liner for efficiently sealing the pipe joint.

BRIEF DESCRIPTION OF THE DRAWINGS

FIG. 1 is a sectional elevational view of a pipe coupling embodying the invention with adjacent pipe sections secured therein.

FIG. 2 is a sectional view taken on line 2—2 of FIG. 1.

FIG. 3 is an elevational view of a pipe coupling embodying the invention with adjacent pipe sections secured therein.

FIG. 4 is a side view of the liner described herein.

DESCRIPTION OF THE PREFERRED EMBODIMENT

Referring to the drawings in detail, reference character 10 generally indicates a pipe coupling comprising a substantially cylindrical outer sleeve 12 for slidably receiving the abutting ends of adjacent pipe sections 14 and 16 therein in a manner as will be hereinafter set forth. A substantially centrally disposed annular recess 18 is provided on the inner periphery of the sleeve 12, and the inner periphery of the sleeve 12 tapers outwardly and radially inwardly in opposite directions from the recess 18 as shown at 20 and 22 in FIG. 1. A plurality of circumferentially spaced wedge members 24 are disposed in the tapered portion 20 and a plurality of similar circumferentially spaced wedge members 26 are disposed in the tapered portion 22 for a purpose and in a manner as will be hereinafter set forth.

The wedges 24 and 26 are of a circular or arcuate cross-sectional configuration as shown in FIG. 2 and the inner peripheries thereof define a substantially cylindrical surface complementary to the outer periphery of the pipe sections 14 and 16, respectively. Similarly, the outer peripheries of the wedge members 24 and 26 taper radially outwardly to define a surface complementary to the tapered portions 20 and 22 of the sleeve 12 whereby the wedge members 24 may be interposed between the sleeve 12 and the pipe section 14 and the wedge members 26 may be interposed between the sleeve 12 and the pipe section 16.

As more particularly shown in FIG. 2, it is preferable to provide three of the wedges 24 (and three of the wedges 26) circumferentially spaced around the outer periphery of the pipe 14 (and pipe 16), and the individual wedges 24 and 26 may be moved longitudinally with respect to the sleeve 12 and pipe sections 14 and 16 for securely wedging the pipe sections within the sleeve 12. In order to facilitate manipulation of the wedge members 24 and 26, each wedge member is provided with a stud member 28 threadedly or otherwise secured thereto for extending radially outwardly therefrom through an elongated bore or slot 30 provided in the sleeve 12 in alignment with each of the wedges disposed therein. The stud member 28 may be manually grasped for sliding the respective wedge within the sleeve 12 as required for wedging the pipe sections therein, and each stud 28 is provided with an enlarged head portion 32 on the outer end thereof for retaining the respective wedge member in a position substantially adjacent the inner periphery of the sleeve 12 as the pipe sections 14 and 16 are inserted therein.

A pair of annular ring members 34 and 36 are disposed in the recess 18 for engagement with the inwardly directed ends 38 and 40 of the wedges 24 and 26. The ring 34 may be of a split construction comprising a pair of semi-circular half sections 34a and 34b as shown in FIG. 2, and the ring 36 may be a similarly split ring, if desired, for facilitating disposing of the rings 34 and 36 within the recess 18 for abuttment with the ends of the wedges 24 and 26. Alternately, the rings 34 and 36 may be constructed with a single cut therein, with the adjacent ends of the respective ring being overlappable in order to contract the diametrical size of the rings 34 and 36 whereby the rings may be easily inserted within the sleeve 12 for disposition in the recess 18. Of course, in this type construction, it is desirable that the rings 34 and 36 be of a sufficiently resilient or spring-like construction as to expand into engagement with the inner periphery of the recess 18 when the rings 34 and 36 are positioned therein.

An expandable substantially torus-like bladder member 38 is disposed within the recess 18 between the rings 34 and 36 and is expandable longitudinally and radially inwardly and radially outwardly for sealing the recess 18 around the pipe joint 40 between the two abutting pipe sections 14 and 16. The bladder member 38 may be of any suitable construction, but preferably comprises an outer cylindrical flexible or yieldable sleeve 42 and an inner cylindrical flexible or yieldable sleeve 44 concentrically disposed therein. The sleeves 42 and 44 are preferably constructed of a suitable rubber material, or the like, which may be vulcanized or otherwise united in a sealing relationship at the outer ends thereof as shown at 46 and 48 to provide a unitary type construction having an internal annular chamber 50 provided therein whereby the bladder 38 may be inflated and deflated as will be hereinafter set forth. A suitable port 52 is provided in the sidewall of the outer sleeve 42 for providing communication with the chamber 50. A suitable valve 54 generally similar to the usual valve provided in a tire innertube is provided in the port 52 and is aligned with and extends into a bore 56 provided in the sleeve 12. A suitable grease fitting 58, such as that commonly known as a zerk fitting is provided in the bore 56 in communication with the valve 54 whereby a fluid may be injected into the chamber 50 for a purpose and in a manner as will be hereinafter set forth.

A relatively still cylindrical liner member 60 is disposed in the inner periphery of the inner sleeve 44 in any well known manner, such as disposition within an annular recess 62 provided on the inner periphery of the sleeve 44. The liner 60 is preferably centrally disposed in the sleeve 44 as shown in FIG. 1 in order to span the pipe joint 50 for a purpose as will be hereinafter set forth. The liner 60 is preferably relatively thin walled, and is provided with a longitudinal slit or cut whereby the cut ends 61 and 63 may be positioned in overalpping positions as shown in FIG. 4 to reduce the diametric size of the liner 60 during insertion of the bladder 38 and liner 60 within the recess 18. In addition, it is to be noted, in FIG. 1, that the overall longitidunal dimension or length of the liner 60 is less than one-half of the overall length of the sleeve 44 whereby the sleeve 44 extends beyond both ends of the liner 60 for direct engagement with the outer periphery of the pipe sections on the opposite sides of the liner when the coupling 10 is in operation.

When it is desired to utilize the coupling 10 for securing the pipe sections 14 and 16 in abutting end-to-end relationship, one set of the wedges, such as the wedges 24, may be inserted into the interior of the sleeve 12 for disposition against the tapered portion 20 thereof. The studs 28 may be inserted through the respective bores 30 and threadedly engaged with the respective wedges 24 whereby the heads 32 are exposed beyond the exterior of the sleeve 12. The heads 32 limit the inward radial movement of the wedges 24 within the sleeve, and permit manual longitudinal movement of the wedges 24 within the sleeve. One of the split rings, such as the ring 34, is then positioned within the recess 18 in the proximity of the inwardly directed ends of the wedges 24, and the deflated bladder 38 may be positioned within the recess 18. The construction of the bladder is sufficiently resilient to permit manipulation thereof into position within the recess 18, and in the deflated condition of the bladder, the inner periphery of the sleeve 44 is of a diameter greater than the outer diameter of the pipe section 14 and 16 in order to preclude interference therebetween during insertion of the pipe sections within the sleeve 12. Furthermore, it will be apparent that the maximum diameter of the liner 60 is slightly greater than the maximum diameter of the inner periphery of the sleeve 44 in the deflated position of the bladder 38 in order to assure a constant continuous liner around the inner periphery of the bladder in both the deflated and inflated positions thereof.

Subsequent to placing of the bladder 38 in the recess 18, the second split ring, such as the ring 36, may be disposed within recess 18 in the proximity of the exposed end 48 of the bladder 38. The next set of wedges, such as the wedges 26 may then be inserted within the sleve 12 and disposed adjacent the tapered portion 22 thereof. The studs 28 may be inserted through the respective bores 30 and threadedly engaged with the respective wedges 26 for limiting the radial inward movement of the wedges 26.

The pipe sections 14 and 16 may then be inserted within the sleeve 12 from the opposite ends thereof as shown in FIG. 1 and in such a manner that the wedges 24 are interposed between the sleeve 12 and the pipe section 14 and the wedges 26 are interposed between the sleeve 12 and the pipe section 16. The pipe sections 14 and 16 are inserted within the sleeve 12 in such a manner as to engage or abut whereby the joint 40 threbetween is substantially centrally disposed within the sleeve, thus centrally disposing the joint 40 in the recess 18. The wedges 24 and 26 may then be moved in opposite outward longitudinal directions to the position shown in FIG. 1 for wedging the pipe sections 14 and 16 securely within the sleeve 12.

A suitable fluid may then be inserted through the fitting 58 and valve 54 for filling the chamber 50 and inflating the bladder 38 in such a manner as to expand the bladder simultaneously in both the longitudinal direction and radially inwardly and outwardly. The longitudinal expansion of the bladder 38 moves the rings 34 and 36 in opposite longitudinal directions in the recess 18 for bearing against the inward ends 35 and 37 of the wedges 24 and 26, respectively. This provides a longitudinal wedging force on the wedges 24 and 26 for retaining the wedges securely in position between the sleeve 12 and pipe sections 14 and 16. The force of the bladder 38 against the rings 34 and 36 also provides a seal therebetween. The radially inward expansion of the bladder 38 urges the inner periphery of the inner sleeve 44 into a tight sealing engagement with the outer periphery of the pipe sections 14 and 16, and also urges the liner 60 into a tight engagement with the pipe joint 40. The liner 60 thus precludes any inward extrusion of the material of the sleeve 44 at the pipe joint. The radially outward expansion of the bladder 38 moves the outer periphery of the outer sleeve 42 into a sealing engagement with the inner periphery of the recess 18.

As hereinbefore set forth, it is to be noted that the bladder 38 tightly or sealingly engages the outer periphery of the pipe sections 14 and 16 on the opposite sides of the liner 60 for assuring an efficient sealing of the pipe joint 40.

The fluid which may be of any suitable type, such as packing grease, or the like, may be sealed within the chamber 50 by closing of the fitting 58 and valve 54 as is well known and the sealing pressure of the bladder will be maintained for sealing the pipe joint 10. The coupled pipe sections 14 and 16 may be installed at the desired site, as is well known, and may remain in position as desired for service. In the event it becomes necessary, additonal fluid may be inserted into the chamber 50, of course, for increasing the sealing efficiency of the coupling 10.

In the event it becomes necessary to remove the pipe sections 14 and 16 from the coupling for any reason, of course, the fluid may be removed or withdrawn from the chamber 50 whereby the bladder 38 will become deflated, thus releasing the longitudinal and radial sealing forces. The wedges 24 and 26 may then be moved longitudinally for releasing the wedging engagement of the pipe sections, and the pipe sections may be withdrawn from the interior of the coupling 10.

It will be apparent that the tube 38 may be constructed in two substantially identical half sections similar to that hereinbefore set forth, but of a shorter overall length, with the half sections being closed at each end to provide a pair of annular sealed chambers. The half sections of the tube may be disposed in longitudinal alignment and spaced apart by a suitable metallic ring (not shown) with each half section preferably bonded to the ring, but not limited thereto. In this manner the coupling 10 may be severed into two sections in such a manner as to maintain a sealed tube for the sealing of each section. In this instance, one half section may be utilized at the end of a pipe line, or the like, and closed with a suitable end plug member for closing the end of a line.

From the foregoing, it will be apparent that the present invention provides a novel coupling particularly designed and constructed for quickly and efficiently securing pipe sections in end-to-end relationship. The novel coupling comprises a sleeve having internal oppositely extending tapered portions for receiving a plurality of circumferentially spaced wedge members thereagainst, with said wedge members being adapted for disposition between the sleeve and a pair of adjacent pipe sections for securely wedging the pipe sections therein. An inflatable bladder member is provided within the sleeve interposed between the inner ends of the sets of wedges and disposed around the joint between the pipe sections. The bladder may be inflated by the insertion or injection of a suitable fluid therein whereby the bladder exerts a longidutinal force in opposite directions and against the oppositely disposed wedge members for assuring an efficient wedging of the pipe sections in the coupling and provides a sealing engagement with the wedge ends. In addition, the inflated bladder provides radial outward and radial inward forces for providing an efficient seal between the pipe joint and sleeve for precluding leakage of fluid at the pipe joint. The novel pipe coupling is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A pipe coupling for sealing a pipe joint between tandem pipe sections arranged in substantially abutting relation and comprising a unitary sleeve havin a centrally disposed bore extending longitudinally therethrough for receiving tandem pipe sections therein and surrounding the pipe joint, an annular recess provided in the bore and substantially centrally disposed between the opposite ends of the sleeve, said bore having converging sidewalls extending in opposite directions from the annular recess of said bore toward the opposite ends of the sleeve, an inflatable torus-like yieldable body disposed around the pipe joint and within the annular recess of said bore, two sets of complimentary wedge members interposed between the pipe sections and sleeves and disposed adjacent the converging sidewalls with each set of wedge members comprising a plurality of circumferentially spaced wedge members, and each of said sets of wedges being disposed adjacent a respective converging sidewall for longitudinal movement in relatively opposite directions for wedging the pipe sections in the sleeve, pressure ring means interposed between the yieldable body and the wedge members, said pressur ring means comprising a plurality of arcuate sections disposed in end to end relation around the outer periphery of the pipe sections, means for selectively inflating the yieldable body for providing sealing pressure between the pipe joint and the inner periphery of the sleeve for providing longitudinally acting pressure on the pressure ring means for providing wedging and sealing pressure of the wedge members against the converging sidewalls of the bore, said yieldable body having a centrally disposed annular recess on the inner periphery thereof, and thin walled liner means received in the annular recess of said yieldable body between the yieldable body and the pipe joint for precluding accidental squeezing of the yieldable body between the abutting pipe sections at the joint, said liner means extending circumferentially around said pipe joint and having overlapping end portions to permit reduction of the diametric size of the liner means when inserting said yieldable body and said liner means within the annular recess of said bore, said liner means being of a longitudinal length less than one-half of the longitudinal length of the yieldable body whereby the yieldable body directly engages the outer periphery of the pipe sections on the opposite sides of the liner for efficiently sealing the pipe joint.

* * * * *